(12) United States Patent
Bartfeld

(10) Patent No.: US 7,346,919 B2
(45) Date of Patent: Mar. 18, 2008

(54) TELEVISION MESSAGING VOCAL RESPONSE GENERATION

(75) Inventor: Eyal Bartfeld, Mazkeret Batia (IL)

(73) Assignee: Integra5 Communications, Inc., Burlington, MA (US)

( * ) Notice: Subject to any disclaimer, the term of this patent is extended or adjusted under 35 U.S.C. 154(b) by 844 days.

(21) Appl. No.: 09/928,741

(22) Filed: Aug. 13, 2001

(65) Prior Publication Data

US 2003/0033605 A1 Feb. 13, 2003

(51) Int. Cl.
*H04N 7/18* (2006.01)

(52) U.S. Cl. .................... 725/109; 725/133

(58) Field of Classification Search ............ 715/729, 715/753; 455/414.4, 563, 412.1, 413; 725/109, 725/133
See application file for complete search history.

(56) References Cited

U.S. PATENT DOCUMENTS

| | | | |
|---|---|---|---|
| 5,497,186 A | 3/1996 | Kawasaki | |
| 5,568,540 A | 10/1996 | Greco et al. | |
| 5,844,552 A | 12/1998 | Gaughan et al. | |
| 5,995,590 A * | 11/1999 | Brunet et al. | 379/52 |
| 6,553,178 B2 * | 4/2003 | Abecassis | 386/83 |
| 6,711,154 B1 * | 3/2004 | O'Neal | 370/352 |
| 6,774,926 B1 * | 8/2004 | Ellis et al. | 348/14.01 |
| 2002/0175930 A1 * | 11/2002 | Kolde et al. | 345/705 |

FOREIGN PATENT DOCUMENTS

| | | | |
|---|---|---|---|
| EP | 0 793 387 A2 | | 9/1996 |
| EP | 1458193 | * | 8/1999 |
| EP | 1458193 A2 | * | 9/2004 |
| WO | WO 98/56188 | | 12/1998 |
| WO | WO 00/44173 A1 | | 7/2000 |

* cited by examiner

*Primary Examiner*—Hunter B. Lonsberry
(74) *Attorney, Agent, or Firm*—Sonia K. Guterman; Adam M. Schoen; Lawson & Weitzen, LLP

(57) ABSTRACT

In a messaging system adapted to operate in a television environment, the invention teaches a method and apparatus for allowing a user to enter textual outgoing message, which is translated to speech by text to speech module. The speech is than delivered to a target server such as a voice mail or e-mail server, for listening by the message recipient.

8 Claims, 3 Drawing Sheets

TELEVISION MESSAGING VOCAL RESPONSE GENERATION

FILED OF THE INVENTION

The present invention relates generally to messaging systems and more specifically to providing vocal response to messages without the need to record respondent voice.

BACKGROUND OF THE INVENTION

Television messaging has been described in documents such as WO 00/44173 to the present inventor. In the same document a system that provides for recording a respondent message was also described. The user records a response, which is captured and then transmitted to the originator of the message. The system may be used for generation, as well as for responding to, messages. Different methods of messaging have been described by Different methods of messaging have been described by the like of U.S. Pat. No. 5,844,552 to Gaughan et al, Hsu et al in WO 98/56188, by WO 00/44173 to Bartfeld—the present inventor, and by others. WO 00/44173 has other applications pending in the US and other countries around the world. Television based messaging is a growing trend that offers ready access to messaging emanating from different sources, utilizing the television wide bandwidth and ready availability to provide easy access to the electronic messaging domain.

Recording the user voice is not always the best approach. It requires a voice capture device, i.e. a microphone, to be placed either in proximity to the television or the set-top box, or in proximity to the user. Placing the microphone in proximity to the TV or the set-top box gives rise to problems of environmental noise, and users are often moving around. Additionally, often the user is reluctant to record his voice due to privacy issues, or not wanting to disturb others.

While the internet and other digital communications means allow the delivery of text messages, voice based messaging systems such as voice mail, allow access to the message using commonly available device such as telephones. By eliminating the need for a data reading device, the messages become accessible remotely or to users that do not have computers handy.

The translation of text to speech (TXTS hereinafter) is well known in the art. It is commonly used in such systems as banking and other automated response systems, as well as for use by people with speech or site disabilities. It is mainly used to translate data from machine to a user, not from user to user, as generally ample speech transmission medium such a telephone, voice mail, or simply speaking at audible range, are abundant, readily available and well known. It is not commonly used for messaging as data messaging is directed to data enabled devices.

It is therefore advantageous to provide a mechanism to transform data messages, entered via keyboards and the like, to voice for delivery to voice enabled services. The present invention is directed to a method and device for doing so.

SUMMARY OF THE INVENTION

In its most general form, the invention comprises a text entry device such as a keyboard or a keypad (e.g. a Television Remote Control keypad), a text capture software module, coupled to a TXTS module, and transmission capacity of the TXTS module output to a messaging server capable of delivering voice messages.

In one preferred embodiment, the invention operates in conjunction with a television messaging system (TMS hereinafter). The TMS is adapted to deliver messages to a subscriber TV via a set-top box. A set-top box is a terminal adapted to receive television transmissions through cable, radio transmission, satellite, data network such as DSL or ISDN, or any other form of transmitting television information. The set-top box decodes the general television transmission, or the messages sent by the TMS, and presents it on the subscriber television. The user responds to a message using a text entry device such as a keyboard or a remote control, coupled to the set-top box. A software text to speech module (TXTS module) in the set top box translates the text to voice. The output of the TXTS may be produced as a data stream or file, or as audible voice. The output of the TTS module is transmitted to a messaging system adapted to provide voice messaging, known hereinafter as a target messaging system, or alternatively as a voice mail system. The transmission may be directly to the target messaging system, or via an intermediate server. While it is preferred to transmit the TTS output as a data file, it may also be transmitted as a voice by providing a telephone connection to the voice mail system and producing speech in audible form.

Preferably, the user is allowed to review, and more preferably to edit his message.

In another embodiment of the invention, the TXTS module resides in a server remote to the user premises (Local Messaging Server or LMS). In such case, input may be provided via a keyboard, or alternatively via a keypad in communication with the server, such as a telephone or cellular phone keypad. Communications may be performed via the set-top box, e.g. with a keyboard connected thereto. In all implementations of the invention, an upstream network should be provided to transmit the user message, in text, voice, or data format, to the target messaging system.

The TXTS functionality may be divided between the set-top box and the LMS. For example keystrokes may be translated and encoded as voice, in the set-top box, and the output transferred to the LMS for storage or delivery to the voice mail system.

Thus in a preferred embodiment, the invention provides for a text to voice messaging device, operating in conjunction with a television messaging system, having messaging software, the system comprises a set-top box in communication with the television messaging system, and adapted to deliver a message through a television coupled thereto. A text-receiving module executed in the set-top box, and adapted to receive text from a user. A text to speech module coupled to said text receiving module for transforming said text into speech, said text to speech module adapted to produce a voice output corresponding to said text. A voice delivery module is coupled to the text to speech module, and adapted to deliver said output to a target messaging system capable of receiving voice messages.

The text to voice messaging device of may further comprising a text entry device to deliver user typed text to said text receiving module.

In one preferred embodiment, the output delivery module is adapted to transmit said output to the target voice messaging system in a voice data file format. In a more preferred embodiment, the output delivery module is adapted to transmit said output to the target voice messaging system in a speech format.

Preferably, the set-top box is adapted to be coupled o an IP network and deliver said output therethrough.

In the preferred embodiment, the target messaging system is a unified messaging system.

Alternatively, the text to voice messaging server, operates in conjunction with a television messaging system for delivering messages to a user, the server comprising a text receiving module, adapted to receive text input from a user, and a text to speech module executed on said server, and coupled to said text receiving module for transforming said text into speech. The text to speech module adapted to produce a voice output corresponding to said text. A voice delivery module adapted to deliver said output to a target voice messaging system is coupled to the text to speech module.

The text to voice messaging server may be adapted to receive said text input via an upstream network selected from a group consisting of a television distribution network, a telephone network, a cellular network, a wireless network, a wired network, a satellite network, a terrestrial network, a DSL network, a data network or a combination thereof.

The output delivery module may be adapted to transmit said output to the target voice messaging system in a voice data file format, or to transmit said output to the target voice messaging system in a speech format.

The target messaging server may be integrated into said television messaging server.

The server functionality described above may be distributed between a server and a set top box, for example, wherein the text receiving module is operating on the set-top box, while the text to speech may be implemented on the server.

The invention also describes a text to speech messaging system operating in conjunction with a television messaging system having a television messaging system, the text to speech messaging system comprising a server located remotely to a user premises, said server adapted to deliver messaging to a television via a downstream network, and a set top box coupled to the downstream network. A text entry device in communications with said set top box, is provided for text entry by a user. The text entry device is coupled to a text to speech module adapted to produce output representative said text in speech format, and a voice delivery module adapted to deliver said output to a target messaging server adapted to receive voice messages is coupled to the text to speech module.

In another aspect, the present invention provides a messaging method comprising the steps of: outputting a message to a user using a television, receiving a response message from a user, said response message comprising text, transforming said text into an output in a speech format, and delivering said output to a messaging server adapted to receive voice messages.

The step of transforming can be carried out by a set-top box coupled to said television. The set top box may be coupled to a data network, e.g. an internet, wherein said step of delivering is performed via said data network. Alternatively, step of delivering is performed by feeding said signals to a telephone network.

Alternatively, a server remote to said television carries out the step of transforming.

The speech output can be in the form of a file containing data representing said speech, or the output may comprise electrical signals representing said speech.

It will be clear to a person skilled in the art that the invention may be carried out by a computer program operating on a general purpose, or even specially adapted computer. It is therefore clear that the invention further covers such computer, that when executed by a computer, will cause the computer to operate substantially in accordance with the methods described above, or adapt the computer to operate substantially in accordance with the systems described above. In this instance, the word computer program relates to the code itself, the media on which it is carried, or its transmission. It further extends to the compiled or un-compiled form, in the form of source code, object code, code intermediate sources (such as in a partially compiled form), or in any other form suitable for use in the implementation of the invention. Computer programs may be standalone applications, software components or plug-ins to other applications. Computer programs may be embodied on a carrier, being any entity or device capable of carrying the computer program: for example, a storage medium such as ROM or RAM, optical recording media such as CD-ROM or magnetic recording media such as floppy discs or hard disks. The carrier may be a transmissible carrier such as an electrical or optical signal conveyed by electrical or optical cable, or by radio or other means. Computer programs may be provided for download across the Internet from a server. Computer programs may also be embedded in an integrated circuit.

SHORT DESCRIPTION OF DRAWINGS

FIG. 1 describes a complete system of one embodiment of the present invention

DETAILED DESCRIPTION

Figure 1:
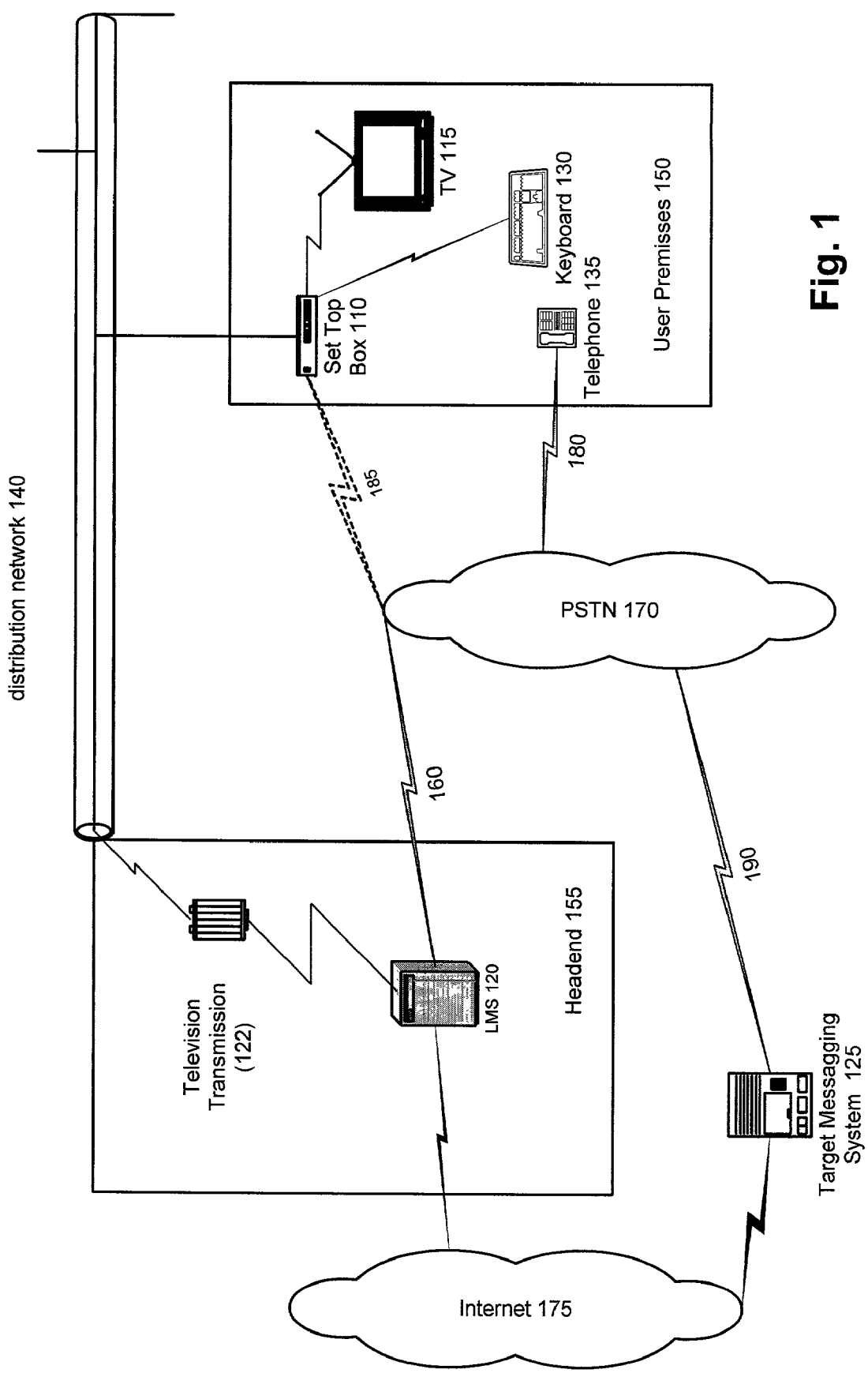
Figure 2:
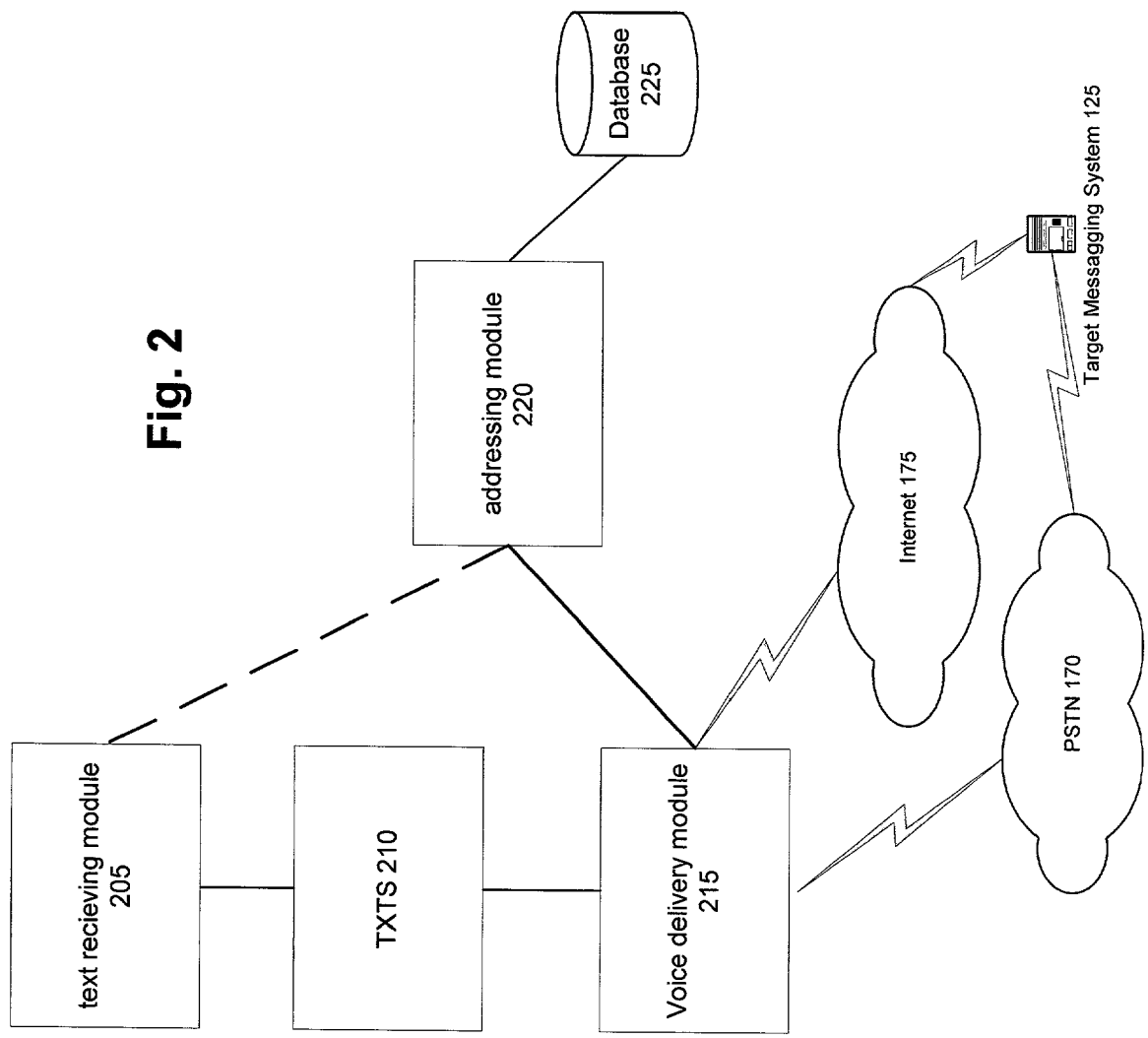
FIG. 2 is a block diagram of modules comprising an embodiment of the invention.

Referring now to FIGS. 1 and 2, a local messaging server 120 is coupled to a television transmission system 122, which is in turn coupled to a television distribution system 140. Television distribution system, also referred to as the 'downstream network', may be any medium adapted to carry television transmissions, for example a cable TV network, a radio or other wireless network, a DSL network, a terrestrial or satellite based network, and other similar media. The downstream network is adapted to deliver the signal to a set-top box 110. The set-top box may be any terminal device adapted to receive the message and display it on a television 115 coupled thereto. In the preferred embodiment depicted in FIG. 1, the set top box is also coupled to a keyboard 130, or any other convenient text entry device, such as a dedicated keypad.

When the user wishes to respond to a message, one option open to him/her is to type the response via the keyboard 130. A text receiving module 205, preferably operated on the set-top box 110, captures the text and transfers the text to a TXTS module 210. The TXTS module may be implemented in software or in hardware, and may operate on the set-top box, or on a server. In FIG. 1, the server is integrated into LMS 120, but it will apparent to those skilled in the art that more than one serer may be deployed and the TXTS may reside on any server, preferably remote to the user premises.

If the TXTS module operates on a server, a method of transferring the text input is required. Such transfer occurs via an upstream network. The upstream network may comprise any convenient means capable of text data transfer, such as by telephone 185, using an uplink in the distribution network 140, as provided by many cable networks, a wireless or wired network, a cellular network, or a combination thereof.

Alternatively, the keyboard or data entry device 130 may be coupled to an upstream network, bypassing the set-top box. Either the text entry device or the set-top box may be coupled to an upstream network different from the downstream network 140, or preferably, if the distribution network is adapted to transfer data upstream as well as downstream, via the distribution network 140.

The TXTS module produces an output, preferably in the form of a data file such as a WAV file. Wav files are a popular file format that contains data directly translated to sound. Other formats, e.g. MP3, and similar voice file formats may off course be used as well. Such file is transferred to the target messaging system 125 as a data file by such methods as the internet 175, a PSTN, 170, or network comprising either LAN or wan, and other methods which are a matter of technical selection. Alternatively, the TXTS may be implemented on the LMS 125. The transfer of the TXTS output to the target messaging system is accomplished by a voice delivery module 215.

In an alternative embodiment, the TXTS module output is in a voice format, i.e. either an electrical stream representing the speech, or in a bit stream that may be directly decoded as such. In such a case, either the TXTS 210 or the voice delivery module, are adapted to dial the target messaging system 125, and automatically deliver the voice output thereto.

The target messaging system may be integrated into the LMS or to the same server on which the TXTS is running., or may be any other voice enabled system, ranging from a simple answering machine, to a cellular network, a unified messaging server, a voice mail server, a telephone network messaging system, and the like.

Addressing information may be provided directly by an incoming message, or preferably by an addressing module 220. The addressing module provides the voice delivery module 215 with the target address to which the message should be sent. The addressing module may extract the information from an incoming message, receive indication from the user, (possibly guiding the user by messages via the television messaging system) or obtain information form a database 225 coupled thereto. An example is if the e-mail, name, or similar addressing information of the recipient is known, the database may contain records containing a voice mailbox associated with the recipient.

Figure 3:
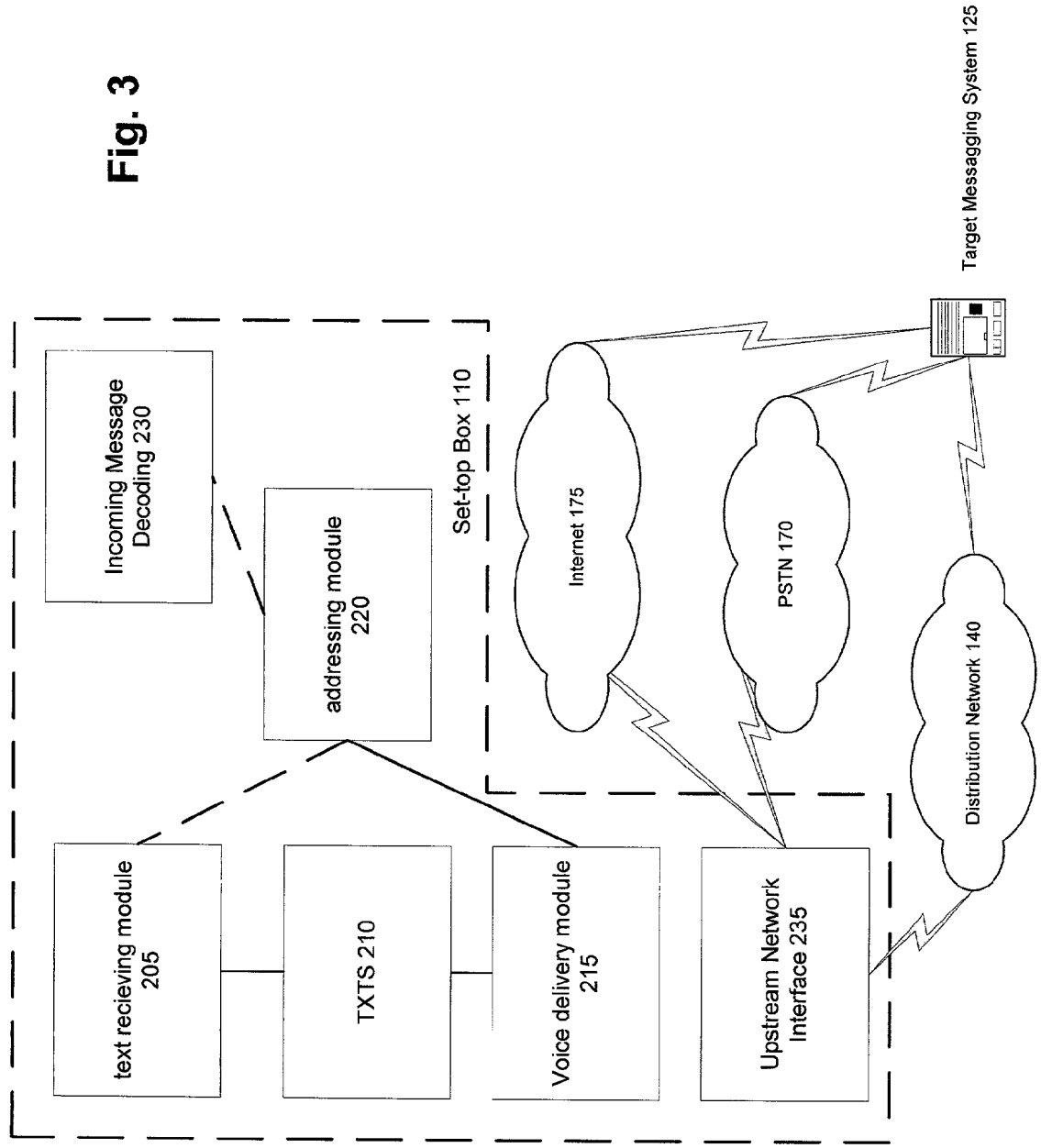
FIG. 3 is a block diagram of another embodiment of the invention showing in context the invention implemented by a set-top box.

FIG. 3 shows an embodiment where the invention operates primarily within the set-top box 110. This embodiment shows yet another embodiment, where an incoming message decoding module 230 is utilized to decode an incoming message and extract a reply address therefrom. Alternatively, the user may enter the address via text receiving module 205. Also noted in this embodiment is that the upstream network interface 235, may be coupled to any number of upstream networks, for delivering the TXTS output. By way of a non-limiting example, a PSTN, Internet, and the distribution, or downstream network may be utilized.

Yet another method of delivering the message to the target system when the TXTS module resides in the set-top box is carried out by connecting the set top box with the PSTN network. The voice signal may be delivered directly to the target messaging system 125 via optional telephony link 185 and 190. As described above, a similar method may be employed in a server based TXTS module and voice delivery module. Clearly, the word telephony network relates to any network adapted to transfer at least voice, such as PSTN, ISDN, etc.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

What is claimed is:

1. A text to voice messaging device, operating in conjunction with a television messaging system, having messaging software, the system comprising:
    a set-top box in communication with the television messaging system, and adapted to deliver a message through a television coupled thereto;
    a text receiving module executed in said set-top box, and adapted to receive text from a user;
    a text to speech module executed in said television messaging system, and coupled to said text receiving module for transforming said text into speech, said text to speech module adapted to produce a voice output corresponding to said text; and
    a voice delivery module adapted to deliver said output as a message to a target messaging system capable of receiving voice messages wherein said voice delivery module is adapted to transmit said output to the target voice messaging system in a voice data file format.

2. A text to voice messaging device, operating in conjunction with a television messaging system, having messaging software, the system comprising:
    a set-top box in communication with the television messaging system, and adapted to deliver a message through a television coupled thereto;
    a text receiving module executed in said set-top box, and adapted to receive text from a user;
    a text to speech module executed in said television messaging system, and coupled to said text receiving module for transforming said text into speech, said text to speech module adapted to produce a voice output corresponding to said text; and
    a voice delivery module adapted to deliver said output as a message to a target messaging system capable of receiving voice messages wherein said set top box is in communication with said messaging system using a downstream network, and wherein text receiving module is coupled to said text to speech module utilizing an upstream network different than said downstream network.

3. A television messaging server, operating in conjunction with a television messaging system for delivering messages to a user, the server comprising:
    a message delivery module for distributing a plurality of messages to a plurality of set-top boxes located in a respective plurality of user premises, for delivery of said messages utilizing a television;
    a text receiving module coupled to a plurality of text entry devices, at least one of said text entry devices being operated in said user premises, for receiving text input therefrom;
    a text to speech module executed on said server, and coupled to said text receiving module for transforming said text into speech, said text to speech module adapted to produce a voice output corresponding to said text; and, a voice delivery module adapted to deliver said output to a target voice messaging system.

4. The television messaging server of claim 3 further adapted to receive said text input via an upstream network selected from a group consisting of a television distribution network, a telephone network, a cellular network, a wireless network, a wired network, a satellite network, a terrestrial network, a DSL network, a data network or a combination thereof.

5. The television messaging server of claim 3 wherein said output delivery module is adapted to transmit said output to the target voice messaging system in a voice data file format.

6. The television messaging server of claim 3 wherein said output delivery module is adapted to transmit said output to the target voice messaging system in a speech format.

7. The television messaging server of claim 3 wherein said target messaging server is integrated into said television messaging server.

8. The television messaging server of claim 3 wherein said distribution of messages occurs over a downstream network, and wherein said text receiving module is coupled to said text entry devices utilizing an upstream network different from said downstream network.

* * * * *